(12) United States Patent
Wright et al.

(10) Patent No.: US 8,589,215 B2
(45) Date of Patent: Nov. 19, 2013

(54) WORK SKILLSET GENERATION

(75) Inventors: Simon Anthony Wright, Sheffield (GB);
Daniel Aucott, Leicestershire (GB);
Gerard James Cafolla, Warwick (GB);
Edward Winston Talbot, Warwickshire (GB); James George Horne Pratt, Hampshire (GB); Paul James Hadley, West Midlands (GB)

(73) Assignee: Silver Lining Solutions Ltd. (GB)

( * ) Notice: Subject to any disclaimer, the term of this patent is extended or adjusted under 35 U.S.C. 154(b) by 65 days.

(21) Appl. No.: 13/182,963

(22) Filed: Jul. 14, 2011

(65) Prior Publication Data

US 2013/0018686 A1    Jan. 17, 2013

(51) Int. Cl.
*G06Q 10/00*    (2012.01)

(52) U.S. Cl.
USPC .......................................... 705/7.42

(58) Field of Classification Search
USPC ................................ 705/50, 7.42; 379/265.12
See application file for complete search history.

(56) References Cited

U.S. PATENT DOCUMENTS

| | | | |
|---|---|---|---|
| 6,347,139 B1* | 2/2002 | Fisher et al. | 379/265.12 |
| 6,453,038 B1* | 9/2002 | McFarlane et al. | 379/265.05 |
| 6,687,560 B2* | 2/2004 | Kiser et al. | 700/108 |
| 7,460,652 B2* | 12/2008 | Chang | 379/88.18 |
| 7,936,867 B1* | 5/2011 | Hill et al. | 379/265.12 |
| 8,010,455 B2* | 8/2011 | Price et al. | 705/50 |
| 2002/0173999 A1* | 11/2002 | Griffor et al. | 705/7 |
| 2006/0047566 A1* | 3/2006 | Fleming et al. | 705/11 |

FOREIGN PATENT DOCUMENTS

| | | |
|---|---|---|
| EP | 1094655 A1 | 4/2001 |
| WO | WO9903248 A2 | 1/1999 |
| WO | WO2005006226 A1 | 1/2005 |

OTHER PUBLICATIONS

International Search Report and Written Opinion of the International Searching Authority, PCT/IB2012/001756, Dec. 4, 2012, 16 pages.

* cited by examiner

*Primary Examiner* — Jonathan G Sterrett
*Assistant Examiner* — Folashade Anderson
(74) *Attorney, Agent, or Firm* — Fish & Richardson P.C.

(57) ABSTRACT

Methods, systems, and apparatus, including computer programs encoded on a computer storage medium, for analyzing work skills. In one aspect, a method includes receiving work task data specifying a plurality of work tasks for a plurality of service providers. For each service provider, receiving performance data specifying an objective measure of a performance metric associated with the service provider performing a work task; receiving assessment data specifying a subjective measure of an attribute associated with the service provider performing the work task; and generating skills data for the service provider based on an aggregation of the assessment data and the performance data. For each of a plurality of customers receiving customer data specifying work tasks requested by the customer; generating mapping data specifying measures of correlation between the skills data for the service providers and the customer data specifying work tasks requested by the customer; and providing the mapping data to an information provider.

13 Claims, 6 Drawing Sheets

WORK SKILLSET GENERATION

BACKGROUND

This specification generally relates to analyzing employee work skills.

Different employees often have different skill sets (e.g., technically proficient, sales experience, multi-lingual, etc.) and employees with the same or similar skill sets (e.g., employees with the same job duties) may have varying degrees of competence with respect to particular skills within their skill sets. Defining employee skill sets and establishing measures of competency in or performance of the various skills in the skill sets can allow employers to better utilize their employees and allow employees to develop new skills or enhance their existing skills. For example, if employee X is highly articulate, well-versed in South American culture and fluent in Portuguese then that employee is likely a better fit for a sales position in Brazil than English-only speaking employee Y with no previous sales experience. Further by assigning employee X to the sales position the employer is likely to benefit from employee X being more effective in the sales position than employee Y based on the match between employee X's skill set and the demands of the sales position.

Likewise, if an employer has two employees with similar skill sets and the employer needs to assign one employee to service its flagship client, then the employer may need to know which of the two employees is the best performer (e.g., as determined by comparing the skills, competencies or performance of the employees) so that the employer can assign that employee to the client.

However, effectively defining and evaluating employee skill sets, and aligning employees having particular skill sets to the demands of particular jobs is not a trivial task.

SUMMARY

In general, one innovative aspect of the subject matter described in this specification can be embodied in methods that include the actions of receiving work task data specifying a plurality of work tasks for a plurality of service providers. For each service provider, receiving performance data specifying an objective measure of a performance metric associated with the service provider performing a work task, wherein the objective measure is an empirically determined measure of the metric; receiving assessment data specifying a subjective measure of an attribute associated with the service provider performing the work task, wherein the subjective measure is a biased measure of the attribute; and generating skills data for the service provider based on an aggregation of the assessment data and the performance data, wherein the skills data define a skillset of the service provider for a performance of the work task. For each of a plurality of customers receiving customer data specifying work tasks requested by the customer; generating mapping data specifying measures of correlation between the skills data for the service providers and the customer data specifying work tasks requested by the customer; and providing the mapping data to an information provider, wherein the mapping data is usable by the information provider to map a service request to a service provider having a skillset correlated with the work tasks requested by the customer.

Other embodiments of this aspect include corresponding systems, apparatus, and computer programs, configured to perform the actions of the methods, encoded on computer storage devices.

Particular embodiments of the subject matter described in this specification can be implemented to realize one or more of the following advantages: generating and providing service request mapping data to service providers to allow the service provider to direct or map service requests (e.g., telephone call inquiries) to the employee(s) best qualified to handle the requests; and identifying particular employee skills that are associated with the successful performance of certain tasks. For example, employees having customer service support experience may sell more products per month than employees without such experience. Thus, hiring employees with customer support experience or training current employees in the customer support area can lead to an increase in the number products sold per month as employees with customer support skills have historically been the employer's most effective salespersons.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

System Overview

Figure 1:
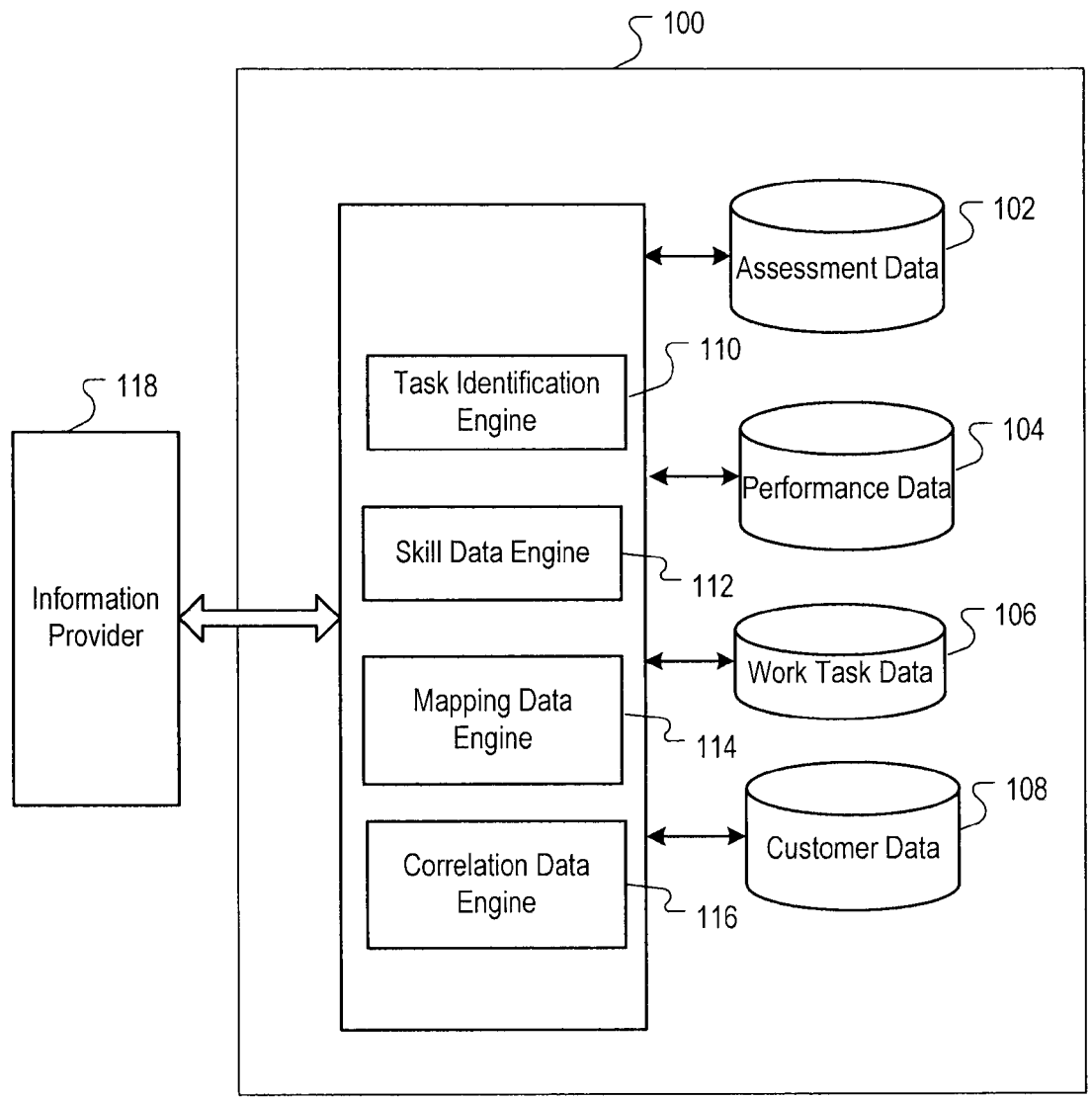
FIG. 1 is a block diagram of an example skills data processing system.

This written description describes methods, software and systems for generating mapping data and correlation data based on service provider skills data. Mapping data are data mapping a service provider with specific skills to particular work tasks or duties. For example, the mapping data may indicate that service providers (e.g., employees) who are technically proficient should receive consumer sales calls, as such service providers may be particularly effective at articulating the technological advantages of the product. The mapping data can be used, for example, by a call center to route incoming calls to the call center to the call center service provider best suited to handle the call based on the subject matter of the call and the service provider's skill set. In another example, the mapping data may indicate that service provider Y should be scheduled to work on a particular day because service providers Y has been trained to use a particular software package and no other service providers trained on that package are available to work on the particular day.

Correlation data are data specifying a correlation between a service provider's skills and the service provider's performance/success at various work tasks. Correlation data, for example, may indicate that most service providers highly skilled at selling product A also have high sales per month rates for product C. As such, if product C, for example, is a high margin product then, beyond product C training, an employer can train more service providers with respect to product A sales to increases the sales of product C. By way of another example, the correlation data may indicate that virtually all service providers highly skilled with respect to customer policies and procedures transfer very few support calls to other service providers for assistance. Accordingly, an employer can provide training to those service providers without such customer policy and procedure skills to reduce the number of calls transferred by those service providers to increase overall service provider call handling efficiency.

As described above, both mapping and correlation data are based on skills data. Skills data define a skillset of a service provider. For example, a service provider skillset may indicate that a service provider has sales experience and has effective management skills. Such skills data are derived from performance data and assessment data.

Performance data specify objective measures of performance metrics associated with work-related tasks for a particular service provider or for a particular job position or function. The objective measures of the performance data are empirically determined (e.g., capable of being directly verified). For example, the performance data may specify that employee X handles, on average, sixty customer service calls per day, or employee X had a sales target last month of twelve product units and sold only three units reaching only 25% of the sales target.

Assessment data specify subjective measures of employee or job position attributes (e.g., strong selling skills or works well in a team environment). Unlike performance data, the assessment data can also specify subjective measures. The measures specified by the assessment data can be affected by the person providing the measure or ranking of the attribute, whereas performance data should not change based on the person providing the measures (e.g., an employee's average call length is the same regardless of who reports the data). For example, an employee attribute might be an employee's ability to handle dissatisfied customers, and one manager of the employee might rank the employee as being highly skilled at handling dissatisfied customers while another manager might rank the employee as only being moderately skilled at handling those same customers.

FIG. 1 is a block diagram of an example skills data processing system 100. The skills data processing system 100 can receive and process performance data and assessment data to generate skills data, and can generate mapping data and correlation data based on the skills data, as described in more detail below. The skills data processing system 100 is typically implemented in computer servers, and can provide and receive data over a network. Example networks include local area networks (LANs), wide area networks (WANs), telephonic networks, and wireless networks.

In some implementations, the skills data processing system 100 includes an assessment data store 102, a performance data store 104, a work task data store 106, and a customer data store 108. Although depicted as separate data stores, the data for each of the data stores 102, 104, 106 and 108 can be stored in a single data store, e.g., such as in a relational database, or any other appropriate storage scheme.

The assessment data store 102 stores assessment data. As described above, assessment data specify subjective measures of employee or job role attributes. For example, the subjective measures can be based on a scale (e.g., 1 to 10 with 10 being the highest measure and 1 being the lowest measure) or be more abstract classifications such as, for example, poor, good or exceptional. However, other ranking or classification methods are also possible. The attributes can be, for example, related to selling skills, customer service skills, job completion timeliness, prioritization ability, work product quality, or any other attribute or characteristic of an employee or job role. Thus, for example, the assessment data may specify that a particular customer service representative has above average customer service skills and average prioritization abilities. The assessment data may also specify that employee X has an average selling skill measure of three on a ten point scale, as ranked by two supervisors of employee X (one supervisor providing a ranking of 2 and the other supervisor providing a ranking of 4). Not only can assessment data be generated for a service provider (e.g., employee) by others (e.g., manager), assessment data can also be generated by the service provider being evaluated, e.g., self-assessments.

The performance data store 104 stores performance data. As described above, performance data specify objective measures of performance metrics. The objective measures are, for example, identified or derived from any measured or other unbiased classification of the performance of a work task (e.g., performance metric) such that the objective measure does not vary based the person(s) reporting the data. Performance data can specify, for example, that employee W transferred four customer service calls to other customer service representatives last week (i.e., the performance metric is the number of calls transferred and the objective measure is four transferred calls). The number of calls transferred is not subject to the vagaries of individual interpretation—e.g., it can be verified from the call transfer log that four calls were transferred. In another example, performance data specify that employee Y, who is a customer service representative, received a 92% customer service feedback score based on surveys ranking various aspects of employee Y's performance during service calls. The results of the surveys are verifiable (e.g., if customer A ranked employee Y as a "3" then regardless of who reports the survey results, the ranking remains a "3"). In yet another example, the performance data may specify that an employee completed a training course.

The work task data store 106 stores work task data specifying work tasks for service providers (e.g., work-related tasks of an employee such as a call center employee or work-related tasks generally describing a job position). Work tasks are any type of job, job duty, aspect of a job or any other type of activity or function such as selling products, manufacturing goods, supervising others, handling service calls, repairing electronics, etc. In some implementations, a set of one or more work tasks can generally describe a job role or position, or can describe a particular employee's job duties or responsibilities.

The customer data store 108 stores customer data specifying work tasks requested by particular customers (e.g., a customer of a call center company employing the call center to handles its customer support calls or to contact prospective purchasers of the customer's products). Different customers can have different work task requirements or requests. For example, customer A may be a manufacturer using a call center to handle technical support service calls (i.e., the work task) and customer B may be an insurance provider using the call center to provide sales services for various insurance offerings for the insurance provider (i.e., the work task).

The customer data can also specify certain customer required or desired attributes or performance levels associated with the requested work tasks. For example, customer A may specify that only call center employees (e.g., service providers) having at least two year's experience in providing technical support over the phone handle its calls and customer B may specify that only call center employees having particular investment credentials (e.g., having obtained an industry certification) handle its calls. Further, in addition to specifying that employees must have two year's experience in providing technical support over the phone, the customer data can also specify that customer A requires the employees to have a bachelor's degree in mechanical engineering. Likewise for customer B, the customer data can also specify that customer B requires the employees to be conversationally fluent in Spanish.

The skills data processing system 100 also includes a task identification engine 110, a skills data engine 112, a mapping data engine 114 and a correlation data engine 116. The task identification engine 110 is configured to receive work task data specifying work tasks for service providers (e.g., customer service employees of a call center company). The specific architecture shown in FIG. 1 is but one example implementation, and other function distributions and software architectures can also be used. Each engine is respectively defined by corresponding software instructions that cause the engine to perform the functions and algorithms described below.

The task identification engine 110 receives the work task data from an employer of the service provider describing the job duties, capabilities and/or competencies of the service provider. In some implementations, the work task data is provided from a database containing work history, credentials and the like of various service providers (e.g., an employment database).

The skills data engine 112 is configured to generate skills data for each service provider based on received assessment data and the performance data associated with the performance of work tasks by the service provider. In some implementations, the assessment data and the performance data are received, for example, from the service provider (e.g., self-surveys), the employer of the service provider or both. The skills data define a skillset of the service provider for the performance of one or more work tasks.

A skillset is a representation of the skills of a service provider. The skillset includes an aggregation of the performance data and assessment data of the service provider with respect to the performance of certain work tasks. Thus, the skillset represents skills of the service provider (e.g., the abilities, aptitudes, competencies, deficiencies and the like of a service provider). For example, the skillset of a service provider (e.g., employee John Smith) can represent that the service provider is a customer service representative with product sales experience. Based on the objective and subjective measures specified by the performance data and assessment data, respectively, the skillset can also represent how well or poorly the service provider performed the work tasks (e.g., an employee performance review). For example, the skillset can represent that the service provider achieved 92% of the service provider's sales goal last year (e.g., based on the performance data). The skills data are described in more detail below.

The mapping data engine 114 is configured to receive customer data specifying work tasks requested by the customer. For example, customer A may be a television cable provider engaging an information provider 118 (e.g., a call center service provider) to handle all of its installation appointment calls and conduct new service sales calls (i.e., work tasks). As such, the mapping data engine 114 receives the customer data from customer A specifying the work tasks as handling installation appointment calls and conducting new service sale calls.

The mapping data engine 114 is also configured to generate mapping data. The mapping data specify measures of correlation between the skills data of the service providers and the customer data specifying work tasks requested by the customer. For example, if the customer data specified a task for handling technical support service calls, the mapping data would include data indicating how well various service providers skillsets map to (correlate with) handling technical support service calls. If the service provider had previous technical support service call experience the correlation measure specified by the mapping data would be high, indicating the service provider is likely well suited to the task. Conversely, if a service provider had no training or experience handling technical support service calls and had no other related skills or attributes (e.g., skills or attributes that would indicate the service provider could effectively handle technical support service calls such as previous non-technical call support experience or electronics repair certifications) then the correlation measure would be low, indicating the service provider is likely not well suited for the task.

The mapping data engine 114 is also configured to provide the mapping data to an information provider 118. In some implementations, the mapping data are used by the information provider 118 to map a service request to a service provider having a skillset highly correlated with the work tasks requested by the customer. For example, if a support call (e.g., the service request) for customer A is received by the information provider 118 (e.g., a call center), the information provider 118 can identify a service provider (e.g., a customer service representative) having a skillset well matched to the subject matter of the service request, and route the service request to that service provider to ensure the request is effectively handled.

The correlation data engine 116 is configured to receive selections of performance metrics from the performance data and skillsets or skills from the skills data. The received selections of performance metrics and skillsets are used by the correlation data engine 116 to generate correlations data for the metrics and skillsets. For example, the correlation data engine 116 can receive selections from an employer of service providers selecting a performance metric of service call handling efficiency (e.g., the average length of a service call) and skillsets of product A sales skill and product B sales skill. In some scenarios there will be numerous selections of performance metrics and numerous selections of skillsets.

As described above, the correlation data engine 116 is configured to generate correlation data between the selected skillsets and each of the selected performance metrics. The correlation data specifies a correlation measure between the selected skillset and each of the selected performance metrics. For example, the received selections are service call handling efficiency, product A sales skill and product B sales skill. All service providers having product A sales skills have high service call handling efficiency ratings and some service providers having product B sales skills have low service call handling efficiency ratings while others have high ratings. As such, the correlation data would reflect a high correlation between product A sales skill and call handling efficiency and a lower correlation between product B sales skill and call handling efficiency (as some service providers having product B sales skills have high efficiency ratings and other service providers having product B sales skills have low ratings).

Analysis of the correlation data allow, for example, employers to determine what skillset(s) are associated with high performance levels for certain work tasks. Thus, if the employer desires to increase service call handling efficiency, the employer can, for example, identify those employees that have not been trained to sell product A and provide product A sales training to those employees.

Generation of the mapping data and the correlation data by the mapping data engine 114 and the correlation data engine 116, respectively, is described in more detail below.

Mapping Data Generation

Figure 2:
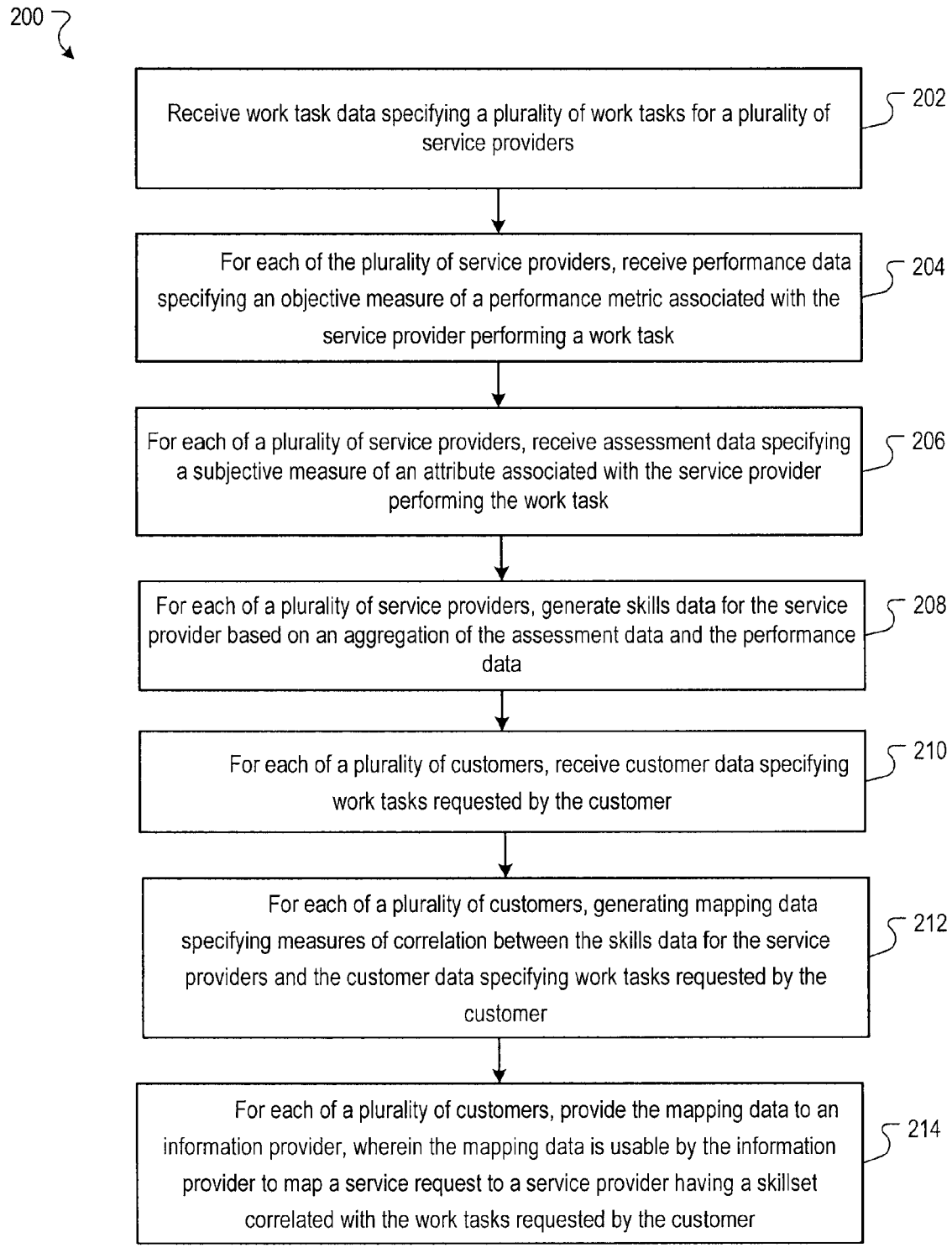
FIG. 2 is a flow diagram of an example process for providing mapping data to information providers.
Figure 3:
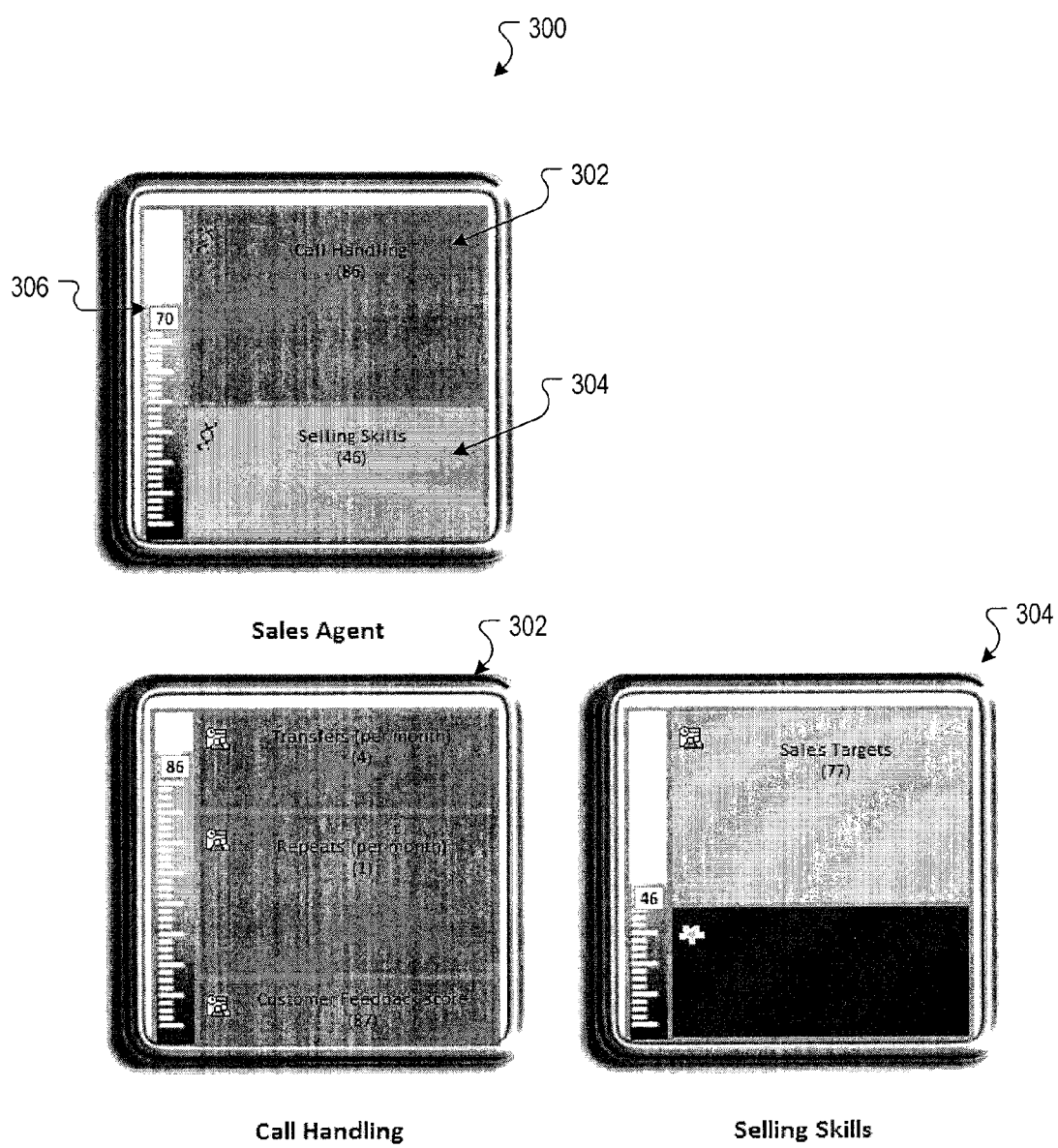
FIG. 3 is an illustration of an example skillset.

One example process by which the skills data processing system 100 generates and provides mapping data to information providers 118 is described reference to FIG. 2, which is a flow diagram of an example process 200 for providing mapping data to information providers 118, and FIG. 3, which is an illustration of an example skillset. The mapping data provided to the information provider, for example, can be used by the information provider to map service requests to service providers having skillsets well matched to requested work tasks. The process 200 can be implemented in one or more computer devices of the skills data processing system 100.

The process 200 receives work task data specifying a plurality of work tasks for a plurality of service providers (202). In some implementations, the task identification engine 110 receives the work task data. The task identification engine 110 can, for example, receive the work task data from service provider employers or directly from the service providers describing the job duties and roles of the service providers. The work task data describes the job duties of a particular type of job (e.g., carpenter, mechanic, customer service representative, etc.) or describe the job duties of a particular service provider (e.g., employee X).

The process 200, for each of the plurality of service providers, receives performance data specifying an objective measure of a performance metric associated with the service provider performing a work task (204). As described above, the objective measure of a performance metric is an empirically determined measure of the performance metric. The objective measure is, for example, verifiable such that the measure is unambiguous. In some implementations, the skills data engine 112 receives the performance data.

The process 200, for each of a plurality of service providers, receives assessment data specifying a subjective measure of an attribute associated with the service provider performing the work task (206). As described above, the subjective measure is a biased measure of the attribute. In some implementations, the skills data engine 112 receives the assessment data.

The process 200, for each of a plurality of service providers, generates skills data for the service provider based on an aggregation of the assessment data and the performance data (208). In some implementations, the skills data engine 112 generates the skills data. The skills data define a skillset of the service provider for a performance of the work task. As described above, the skillset represents the skills of a service provider (e.g., actual skills of an employee or desired skills with respect to a job position or role). Skillsets can have one or more skills. A skillset is described with reference to FIG. 3, which is an illustration of an example skillset 300.

Skillset 300 is a skillset for a particular sales agent (e.g., service provider). The skillset 300 for this particular sales agent is described by two skillset blocks 302 and 304 for call handling and selling skills, respectively. The skillset blocks can also correspond to work tasks. For example, skillset block 302 corresponds to the work task of handling customer service telephone calls and skillset block 304 corresponds to the work task of selling products or services.

Each skillset block can have a skillset block score. For example, each skillset block 302 and 304 has a skillset block score, e.g., 86% for call handling and 46% for selling. The scores quantify the sales agent's performance with respect to threshold performance levels associated with the skills represented by the skillset blocks. For example, the sales agent's score for call handling is 86%. Thus, based on a desired performance level for call handling, the sales agent is performing at 86% of that level (e.g., based on goals for transfers per month, repeats for month and customer feedback score of 3, 1 and 90, respectively). Although the sales agent's score for call handling is less than 100%, the sales agent can still be performing at an acceptable level (e.g., if the minimum acceptable score for call handling is 75%). The desired performance levels are set, for example, by the service provider's employer. The skillset blocks can be color-coded to indicate if the service provider is, for example, exceeding (e.g., green), at (e.g., amber) or below (e.g., red) the thresholds. Such color-coding permits, for example, an employer to quickly determine if the service provider is performing at desired levels.

In some implementations, the skillset block scores are derived from subjective or objective measures from assessment and performance data associated with work tasks requiring skills similar to those represented by the skillset blocks. For example, the score for skillset block 302 is derived from three objective measures (from the performance data): transfers per month (i.e., the number of calls transferred to other agents), repeats per month (i.e., the number of times per month a caller makes a repeat call to seek additional assistance) and customer feedback scores (i.e., the feedback scores provided by the callers regarding the sales agent's performance).

The objective measures in skillset block 302 are combined (or aggregated) to form the skillset block score, 86%. For example, if four transferred calls per month is at the 75% performance level for transferred calls per month, one repeated call per month is at the 88% performance level for repeat calls per month and the customer feedback score of 87 is at the 95% performance level then an average of these scores is the 86% score for the call handling skillset block 302. However, the measures may also be weighted differently in determining the skillset block score, as some measures may be determined to be more important than others (e.g., as determined by an employer). For example, the repeat calls per month measure can have the highest weight (e.g., it influences the skillset block score the most), the customer feedback score measure can have the lowest weight (e.g., it influences the skillset block score the least) and the transfers per month measure is weighted in between the two.

In some implementations, the weight of the various measures is graphically reflected in the illustration of the skillset block. For example, for skillset block 302, the portion of the block 302 for repeat calls per month is larger than that for transfers per month, which, in turn, is larger than the customer feedback portion—which indicates the measure for repeat calls is the highest weighted measure and the measure for customer feedback is the lowest weighted measure.

Although the score for skillset block 302 was derived from only performance data, scores can also be derived from only assessment data or both performance and assessment data, which is the case for skillset block 304. For example, the score for skillset block 304 is derived from one objective measure, sales target, and one subjective measure, selling skills. The sales target measure indicates the performance of the sales agent with respect to meeting the agent's sales goal (e.g., sales goal was 100 units and the agent sold 77 units=77% performance level). This is an objective measure of the agent's sales performance. The selling skills measure is, for example, a subjective measure of the aptitude of the agent with respect to selling products or services, as determined by a review from the agent's manager. It should be noted that the manager's subjective review of the agent's performance can take into account the agent's success in meeting the agent's sales target in addition to, for example, other tangible or intangible qualities such as leadership abilities. Thus, generally, subjective measures can be based on objective criteria. The objective measure and subjective measure in skillset block 304 can be combined in a manner similar to that described above with reference to block 302 to form the skillset block score (i.e., 46%).

In addition to the skillset having skillset block scores, the skillset can also have an overall service provider skillset score, as indicated by the leftmost score column 306. For example, skillset 300 has a skillset score of 70%. The skillset score is based on its skillset block scores. For example, the skillset score for skillset 300 is based on the skillset block scores of skillset blocks 302 and 304. The skillset score is a weighted (or non-weighted) combination of its skillset block scores. For example, the skillset block 302 is more heavily weighted than skillset block 304 (e.g., as indicated by the larger area of skillset block 302 as compared to the area of skillset block 304 in the illustration of skillset 300). The employer can weight the skillset block in accordance with the employers' determination of relative importance of the particular skillset blocks.

In some implementations, as measures associated with the skillset blocks are updated or revised as additional information about the service provider's performance of work tasks becomes available, the skillset blocks too are updated to reflect those changes. For example, if a manager completes a new review of the service provider's performance then the assessment data for the service provider, including the manager's new, subjective, review would be updated, which would be reflected in the skillset blocks and the skillset. More generally, additional performance data and additional assessment data are received (e.g., received by the skills generation engine 112) and the skills data are updated to reflect the additional performance data and additional assessment data (e.g., updated by the skills generation engine 112).

In some implementations, skillset blocks are added or removed from skillsets based on the service provider's activities. For example, if a service provider completes a training course for a skill not yet reflected in that service provider's skillset, then a new skillset block is added to the skillset. In some implementations, skillset data and skillsets are assigned to particular service providers (e.g., the service provider from which the assessment and performance data used to generate the skills data was obtained).

Although skillset 300 has two skillset blocks, other skillsets can have more or less blocks (e.g., depending on the scope or complexity of the corresponding work task(s) performed by a service provider). Likewise, a particular skillset block can be based on any number of objective or subjective measures.

The process 200, for each of a plurality of customers, receives customer data specifying work tasks requested by the customer (210). For example, the customer data are received from a manufacturer (i.e., the customer) employing a call center service provider to handle its sales calls. As described above, customer data specify work tasks requested by particular customers and required or desired attributes or performance levels associated with the requested work tasks. In some implementations, the mapping data engine 114 receives the customer data.

The process 200, for each of a plurality of customers, generates mapping data specifying measures of correlation between the skills data for the service providers and the customer data specifying work tasks requested by the customer (212). As described above, the mapping data specifies a measure of correlation between service provider skills (e.g., software troubleshooting proficiency or sales experience) and work-related tasks or duties (e.g., such as those requested by customers).

The process 200, for each of a plurality of customers, provides the mapping data to an information provider (214). The mapping data are usable by an information provider 118 to map a service request to a service provider having a skillset correlated with the work tasks requested by the customer. The information provider 118 (e.g., call center service provider) can, for example, use the mapping data to map service requests (e.g., customer service calls) to service providers having skillsets well matched (e.g., highly correlated) to the subject matter of the service requests. For example, a consumer may call a customer service center seeking assistance with the setup of a recently purchased television (e.g., via a telephonic menu, through which the consumer specifies product/problems being experienced). The call center receiving the request can utilize the mapping data to route the incoming call to a customer service support specialist knowledgeable about television setups, as opposed to a support specialist having little experience with television setups. Routing the call to a knowledgeable support specialist enhances the customer experience because the customer receives assistance from a subject matter expert.

Additionally, the mapped routing process benefits the call center as the call is handled in a time-efficient manner (e.g., the call is not arbitrarily bounced from one support specialist to the next attempting to identify a specialist that can handle the call), and benefits the manufacturer of the television as the customer has a positive support experience with a knowledgeable support specialist.

Correlation Data Generation

Figure 4:
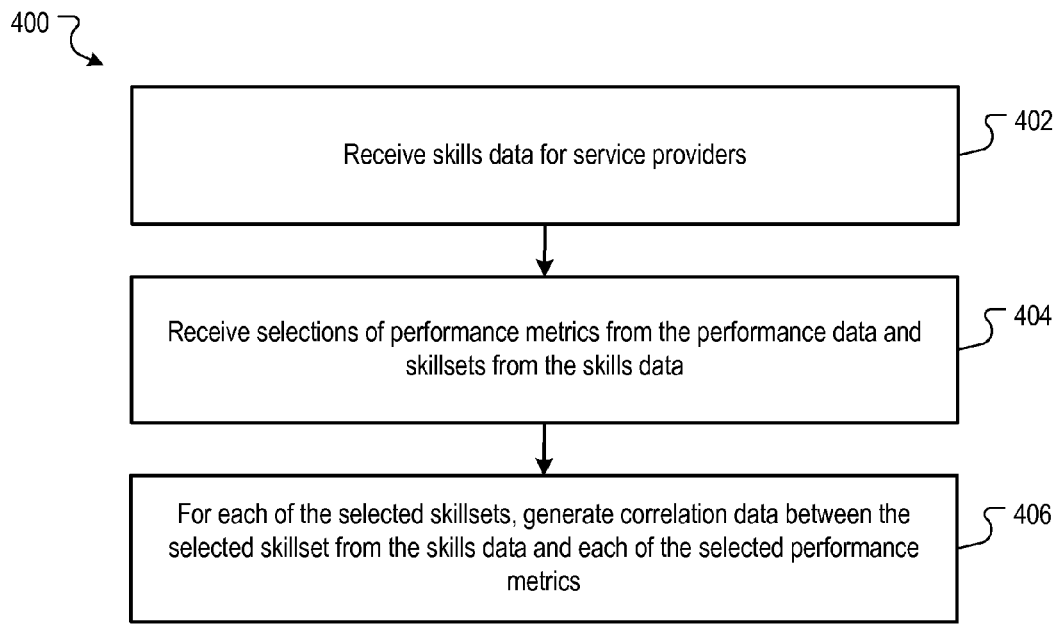
FIG. 4 is a flow diagram of an example process for generating correlation data.

As described above, the skills data are used to generate mapping data. In addition, the skills data processing system 100 can also use the skills data to generate correlation data. One example process by which the skills data processing system 100 generates correlation data is described reference to FIG. 4, which is a flow diagram of an example process 400 for generating correlation data, and to FIG. 5, which is an illustration of an example correlation data chart. The process 400 can be implemented in one or more computer devices of the skills data processing system 100.

The process 400 receives skills data for service providers (402). In some implementations, the correlation data engine 116 receives the skills data from the skills data engine 112. In further implementations, the process 400 receives performance and assessment data and generates skills data for service providers based on the performance and assessment data in a manner similar to that described above with reference to process 200.

The process 400 receives selections of performance metrics from performance data and skillsets from the skills data (404). In some implementations, the correlation data engine 116 receives the selections of performance metrics and skillsets. For example, the received selections could be selections from an employer based on skills data and performance metrics associated with the employer's employees. The received selections of skillsets or skills are, for example, skills represented by skillset blocks 302 (i.e., call handling) and 304 (selling skills) and the selections of performance metrics are metrics for the number of sales of products D and E. In other scenarios, any number of skills represented by skillsets (or skillset blocks) and any number of performance metrics can be selected.

The process 400, for each of the selected skillsets, generates correlation data between the selected skillset from the skills data and each of the selected performance metrics (406). The correlation data for the selected skillset specifies a correlation measure between the selected skillset and each of the selected performance metrics. For example, if employees with high skillset block scores for skillset block 302 also have high performance levels for product D sales then the correlation data would indicate a strong correlation (e.g., 93.74% correlation) between those skills and that performance metric. On the other hand, if half of the employees with high skillset block scores for skillset block 304 have low performance levels for product D sales and the other half have high performance levels for product D sales then the correlation data would indicate a weak correlation between those skills and that performance metric (e.g., 50% correlation). If the employer desired to increase product D sales then the employer could provide training to employees unskilled with respect to call handling skills (i.e., the skill represented by skillset block 302).

Figure 5:
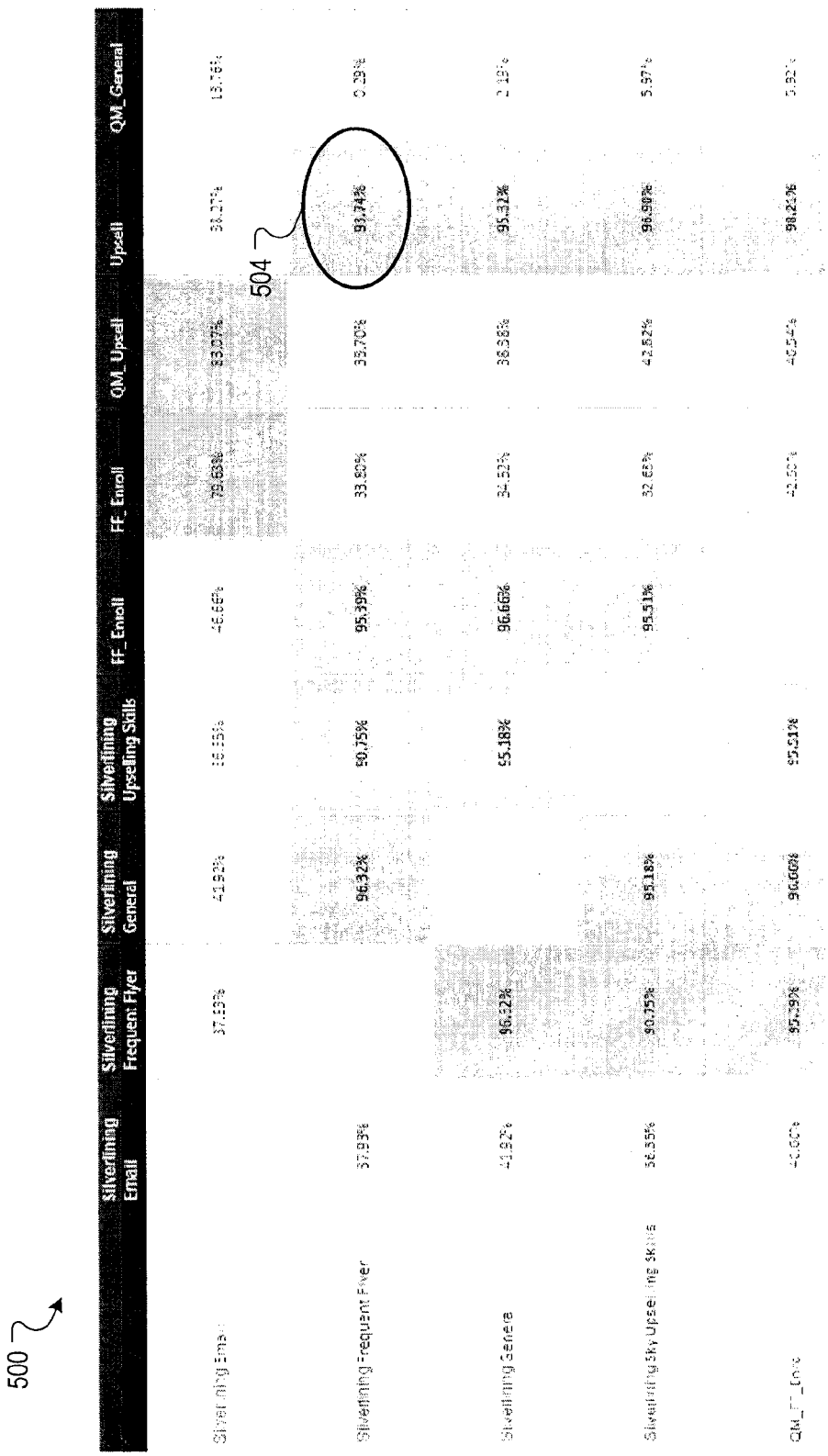
FIG. 5 is an illustration of an example correlation data chart.

Correlation data can be presented in many ways, for example, as shown in chart 500 of FIG. 5. Correlation data chart 500 shows the correlation measures between a selected group of skillsets and performance metrics associated with certain work-related tasks (e.g., Silverlining Email, Silverlining Frequent Flyer, Silverlining General, Silverlining Upselling Skills, etc.). For example, the skillset associated with Silverlining Frequent Flyer task has a 93.74% correlation with the performance metric associated with Upsell (e.g., a product upsell event) as indicated by the focus marker 504. Various other correlation measures are also depicted by chart 500.

In general, the correlation measures indicate which skillsets affect which performance metrics. In some implementations, the correlation data engine 116 generates the correlation data and uses the Pearson correlation model to generate the correlation data. However, other correlation techniques can also be used.

In some implementations, the correlation data engine 116 identifies skillset and performance metric pairs having correlation measures that exceed a correlation threshold. For example, if an employer desires to identify skills or skillsets that increase a certain performance metric associated with a work task (e.g., product D sales) then the employer can set a correlation threshold defining a minimum correlation measure such that the correlation data engine 116 will only identify or highlight skills or skillsets that have correlation measures with the performance metric greater than the threshold (e.g., the shaded cells in chart 500). This can reduce the burden on the employer when determining which correlated pairs have, for example, correlation measures above a desired threshold.

Additional Skillset Data Applications

As described above, skills data are used to generate mapping data and correlation data. However, skills data can also be used for other purposes. For example, skills data can be used to identify servicer provider skill or performance deficiencies, or identify the top performing service providers.

In some implementations, skillsets are generated based on the performance of work tasks and attributes of particular service providers (e.g., employee W) and assigned to those specific service providers. In further implementations, skillsets are also generated and assigned to a service provider role or job position (i.e., a template skillset) independent of the individual performing that role. In some implementations, the skills data engine 112 generates the template skillsets.

In some implementations, the skillset blocks for template skillsets are selected based on desired skills for that service provider position (e.g., software support service representatives should have certain industry certifications, excellent customer service skills and at least average selling skills). Employers or potential employers, for example, select the desired skillset blocks representing desired skills for the position. Further, the objective and subjective measures associated with those skillset blocks can be set to desired performance levels. For example, for the software support position, the desired performance levels are a 75% performance level with respect to customer service skills (e.g., as determined by customer survey feedback scores—an objective measure) and a 42% performance level for selling skills (e.g., as determined by a manager evaluation of the representative—a subjective measure). Thus, the template skillset for the job role indicates, for example, the desired skills of an employee occupying that role or a minimum skillset for employees occupying that role.

In some implementations, the template skillsets can be used by the skills data engine 112 to analyze the skillsets or performances of particular service providers by comparing the service providers' skillsets with the corresponding template skillsets assigned to service providers' job positions, as specified in the respective skills data. For example, if employee X is a customer service representative, employee X's skillset can be compared with that of the template skillset for the customer service representative job position (e.g., as defined by employee X's employer). In some implementations, this process is used to permit employers, for example, to identify skill gaps in a service provider's skillset (as compared with those in the template skillset). If the comparison of the employee's skillset to the template skillset identifies that the employee has skills gaps (e.g., the employee's skill data does not include a skill included in the template skillset) then, for example, additional training can be provided to the employee to bridge the gaps.

In some implementations, an employer sets acceptability thresholds (e.g., a minimum performance levels or scores) for particular objective measures, subjective measures, skillset scores, skillset block scores or combinations thereof in the template skillsets. This template skillset can then be compared by the skills data engine 112 to the skillset of a particular service provider (having the job position corresponding to the template skillset) to determine if the measures or scores for the service provider are below the acceptability threshold(s) in the template skillset. In response to at least one of the measures or scores being below the acceptability threshold, the system 100 can generate data indicating that the measure or score is below the acceptability threshold (e.g., color-coding the skillset block in the service provider's skillset representation). This process permits employers, for example, to determine if an employee is underperforming (or over performing if the thresholds are exceeded) in his/her job position.

In some implementations, skillset scores or skillset block scores (e.g., performance values) from the skills data assigned to a service provider (e.g., an employee) are compared to the skillset scores or skillset block scores (e.g., performance values) from the skills data assigned to other service providers (e.g., other employees). For example, for service providers having the same work tasks or skillsets, the service providers' skills data can be compared to determine which service providers are the highest performers (e.g., compare the service providers' skillset scores). In another example, the service providers' skillset data can be compared to determine which service providers have the broadest skillsets (e.g., service provider A may have more skills than any other service providers as determined by a comparison of the providers' skillset blocks). In some implementations, the skills data engine 112 compare the service providers' skillsets.

Figure 6:
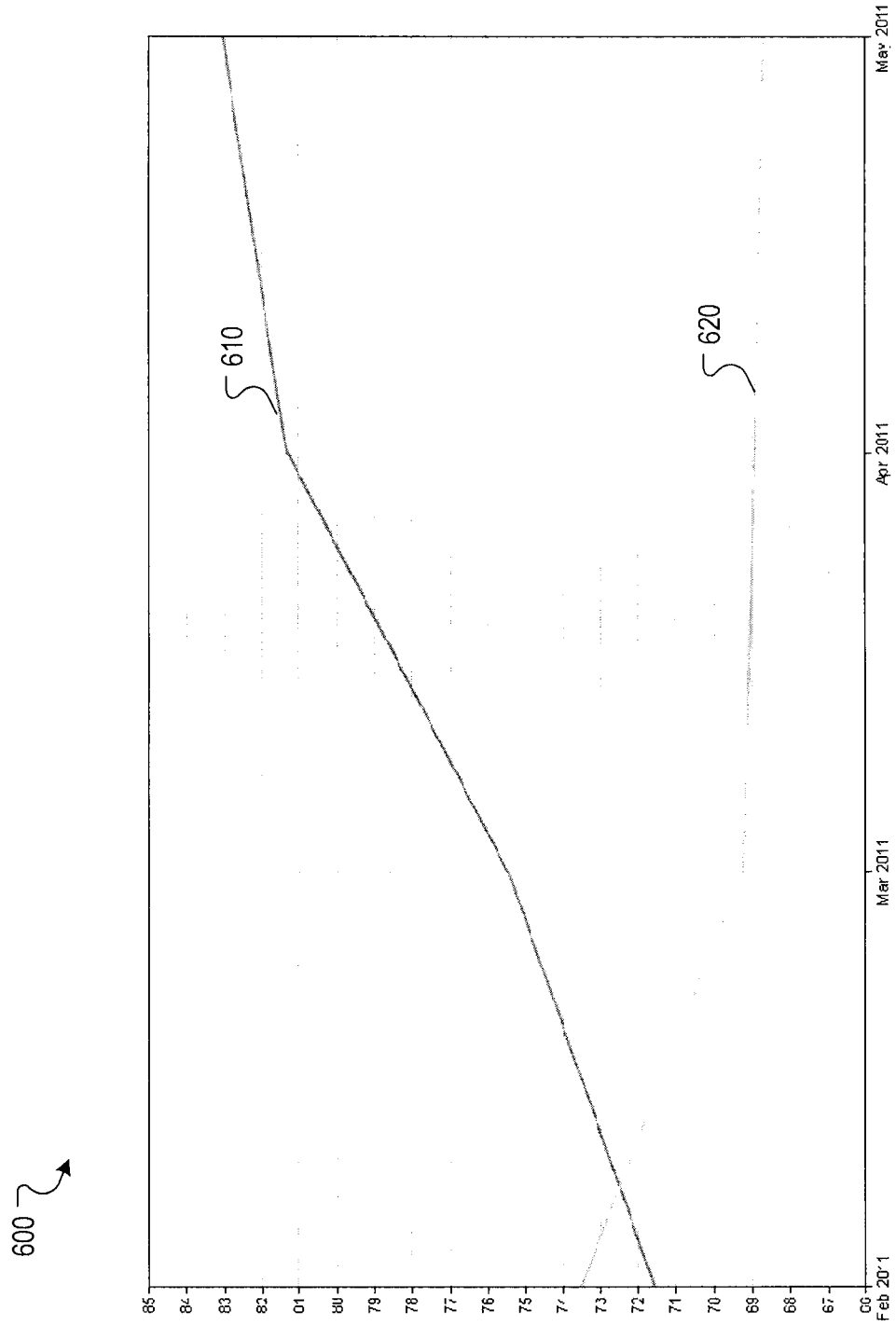
FIG. 6 is a chart illustrating changes in service provider skillset scores during a time period.

The skillset scores or skillset block scores for a service provider or group of service providers can be tracked during time periods to provide insight into changes in service provider performance over time. For example, service provider skillset scores may change during a given time period based on changes in work task performance levels of the service provider (e.g., by gaining experience or receiving additional work task-related training) or the receipt of additional managerial reviews (e.g., assessment data) for the service provider. This tracking process can be described with reference to FIG. 6, which is a chart 600 illustrating changes in service provider skillset scores during a time period. Chart 600 shows skillset scores ranging from 66 to 85 on the x-axis and a time period from February 2011 to May 2011 on the y-axis.

Performance tracking indicator 610 shows the skillset score for service provider A (or an average skillset score for a group of service providers) increasing from 71.6% in February 2011 to 83% in May 2011. The skillset for service provider A increased during this time period because, for example, service provider A increased her work task performance levels or received positive reviews from her supervisors.

Performance tracking indicator 620 shows the skillset score for service provider B (or an average skillset score for a group of service providers) decreasing from 73.5% in February 2011 to 68.8% in May 2011. The skillset for service provider B decreased during this time period because, for example, service provider B's work task performance levels decreased or service provider B received negative reviews from her supervisors. Although chart 600 shows changes in skillset scores for two service providers during a four month period, any number of service provider skillset scores can be tracked over any desired time range (e.g., less or more than four months). Additionally, in some implementations, skillset block scores are also tracked. In some implementations, the skills data engine 112 tracks changes in service providers' skillset scores.

Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 7:
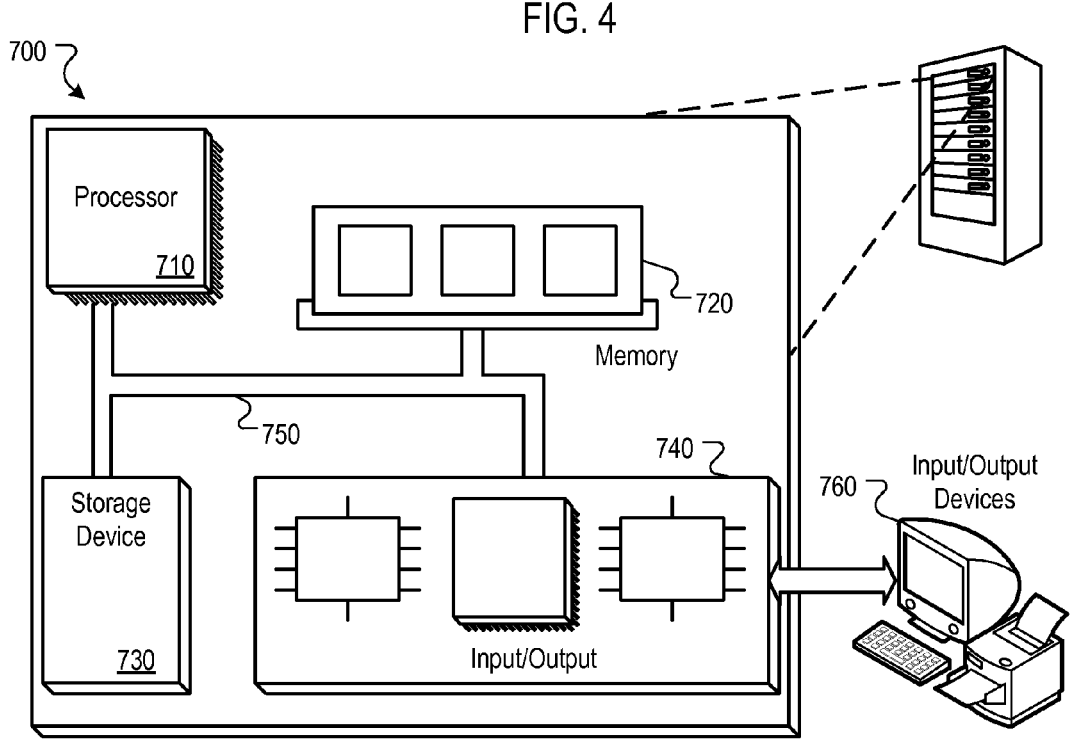
FIG. 7 is a block diagram of a programmable processing system.

An example of one such type of computer is shown in FIG. 7, which shows a block diagram of a programmable processing system (system). The system 700 that can be utilized to implement the systems and methods described herein. The architecture of the system 700 can, for example, be used to implement a computer client, a computer server, or some other computer device.

The system 700 includes a processor 710, a memory 720, a storage device 730, and an input/output device 740. Each of the components 710, 720, 730, and 740 can, for example, be interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 can, for example, include a hard disk device, an optical disk device, or some other large capacity storage device.

The input/output device 740 provides input/output operations for the system 700. In one implementation, the input/output device 740 can include one or more network interface devices, e.g., an Ethernet card, a serial communication device, e.g., an RS-232 port, and/or a wireless interface device, e.g., an 802.11 card. In another implementation, the input/output device can include driver devices configured to receive input data and send output data to other input/output devices, e.g., keyboard, printer and display devices 760.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A computer implemented method, comprising:
receiving work task data specifying a plurality of work tasks for a plurality of service providers;
for each of the plurality of service providers:
  receiving performance data specifying objective measures of performance metrics associated with the service provider performing one or more work tasks, wherein each objective measure of a performance metric is an empirically determined measure of the performance metric;
  receiving assessment data specifying subjective measures of attributes associated with the service provider performing the one or more work tasks, wherein each subjective measure of an attribute is a biased measure of the attribute; and
  generating, by one or more data processors, skills data for the service provider based on an aggregation of the assessment data and the performance data, wherein the skills data define a skillset of the service provider for a performance of the one or more work tasks and the skills data specify performance values associated with the skillset based on the objective measures of the performance metrics and the subjective measures of the attributes, wherein generating skills data includes:
    generating skillset block data specifying skillset blocks, each skill set block graphically representing a particular work task different from work tasks represented by each other skillset block, wherein each work task specifies at least two objective measures or subjective measures or a combination of objective and subjective measures;

for each of multiple skillset blocks, weighting each measure specified by the work task represented by the skillset block differently from each other measure specified by the work task;

determining a skillset block score for each skillset block based at least in part on the weighted measures specified by the work task represented by the skillset block, wherein the skillset block scores are represented in the skills data;

assigning the skills data to the service providers;

comparing the performance value from the skills data assigned to one of the service providers to the performance value from the skills data assigned to one or more other of the service providers;

for each of a plurality of customers:
receiving customer data specifying a set of the work tasks requested by the customer;
generating mapping data specifying measures of correlation between the skills data for the service providers and the customer data specifying the set of the work tasks requested by the customer; and
providing the mapping data to an information provider, wherein the mapping data is usable by the information provider to map a service request to a service provider having a skillset correlated with the set of the work tasks requested by the customer.

2. The method of claim 1, wherein the service request is an incoming telephone customer service call.

3. The method of claim 1, further comprising comparing the skills data assigned to the service providers with skillsets for certain job roles.

4. The method of claim 1, further comprising assigning the skills data to a job role.

5. The method of claim 1, further comprising:
receiving at least one of additional performance data and additional assessment data; and
updating the skills data to reflect the at least one of additional performance data and additional assessment data.

6. The method of claim 1, further comprising:
setting an acceptability threshold for at least one of the objective measures of the performance metrics or the subjective measures of the attributes; and
in response to the at least one of the objective measures or the subjective measures being below the acceptability threshold, indicating that the at least one of the objective measures or the subjective measures is below the acceptability threshold.

7. A system, comprising:
a data processing apparatus; and
software stored on a computer storage apparatus and comprising instructions executable by the data processing apparatus and upon such execution cause the data processing apparatus to perform operations comprising:
receiving work task data specifying a plurality of work tasks for a plurality of service providers;
for each of the plurality of service providers:
receiving performance data specifying objective measures of performance metrics associated with the service provider performing one or more work tasks, wherein each objective measure of a performance metric is an empirically determined measure of the performance metric;
receiving assessment data specifying subjective measures of attributes associated with the service provider performing the one or more work tasks, wherein each subjective measure of an attribute is a biased measure of the attribute; and
generating skills data for the service provider based on an aggregation of the assessment data and the performance data, wherein the skills data define a skillset of the service provider for a performance of the one or more work tasks and the skills data specify performance values associated with the skillset based on the objective measures of the performance metrics and the subjective measures of the attributes, wherein generating skills data includes:
generating skillset block data specifying skillset blocks, each skill set block graphically representing a particular work task different from work tasks represented by each other skillset block, wherein each work task specifies at least two objective measures or subjective measures or a combination of objective and subjective measures;
for each of multiple skillset blocks, weighting each measure specified by the work task represented by the skillset block differently from each other measure specified by the work task;
determining a skillset block score for each skillset block based at least in part on the weighted measures specified by the work task represented by the skillset block, wherein the skillset block scores are represented in the skills data;
assigning the skills data to the service providers;
comparing the performance value from the skills data assigned to one of the service providers to the performance value from the skills data assigned to one or more other of the service providers;
for each of a plurality of customers:
receiving customer data specifying a set of the work tasks requested by the customer;
generating mapping data specifying measures of correlation between the skills data for the service providers and the customer data specifying the set of the work tasks requested by the customer; and
providing the mapping data to an information provider, wherein the mapping data is usable by the information provider to map a service request to a service provider having a skillset correlated with the set of the work tasks requested by the customer.

8. The system of claim 7, wherein upon execution of the instructions, the data processing apparatus further performs operations comprising:
receiving at least one of additional performance data and additional assessment data; and
updating the skills data to reflect the at least one of additional performance data and additional assessment data.

9. The system of claim 7, wherein upon execution of the instructions, the data processing apparatus further performs operations comprising:
setting an acceptability threshold for at least one of the objective measures of the performance metrics or the subjective measures of the attributes; and
in response to the at least one of the objective measures or the subjective measures being below the acceptability threshold, indicating that the at least one of the objective measures or the subjective measures is below the acceptability threshold.

10. The system of claim 7, wherein the service request is an incoming telephone customer service call.

11. A non-transitory computer storage medium encoded with a computer program, the program comprising instructions that when executed by data processing apparatus cause the data processing apparatus to perform operations, comprising:

receiving work task data specifying a plurality of work tasks for a plurality of service providers;

for each of the plurality of service providers:

receiving performance data specifying objective measures of performance metrics associated with the service provider performing one or more work tasks, wherein each objective measure of a performance metric is an empirically determined measure of the performance metric;

receiving assessment data specifying subjective measures of attributes associated with the service provider performing the one or more work tasks, wherein each subjective measure of an attribute is a biased measure of the attribute; and generating skills data for the service provider based on an aggregation of the assessment data and the performance data, wherein the skills data define a skillset of the service provider for a performance of the one or more work tasks and the skills data specify performance values associated with the skillset based on the objective measures of the performance metrics and the subjective measures of the attributes, wherein generating skills data includes:

generating skillset block data specifying skillset blocks, each skill set block graphically representing a particular work task different from work tasks represented by each other skillset block, wherein each work task specifies at least two objective measures or subjective measures or a combination of objective and subjective measures;

for each of multiple skillset blocks, weighting each measure specified by the work task represented by the skillset block differently from each other measure specified by the work task;

determining a skillset block score for each skillset block based at least in part on the weighted measures specified by the work task represented by the skillset block, wherein the skillset block scores are represented in the skills data;

assigning the skills data to the service providers;

comparing the performance value from the skills data assigned to one of the service providers to the performance value from the skills data assigned to one or more other of the service providers;

for each of a plurality of customers:

receiving customer data specifying a set of the work tasks requested by the customer;

generating mapping data specifying measures of correlation between the skills data for the service providers and the customer data specifying the set of the work tasks requested by the customer; and providing the mapping data to an information provider, wherein the mapping data is usable by the information provider to map a service request to a service provider having a skillset correlated with the set of the work tasks requested by the customer.

12. The computer medium of claim 11, wherein upon execution of the instructions, the data processing apparatus further performs operations comprising:

setting an acceptability threshold for at least one of the objective measures of the performance metrics or the subjective measures of the attributes; and in response to the at least one of the objective measures or the subjective measures being below the acceptability threshold, indicating that the at least one of the objective measures or the subjective measures is below the acceptability threshold.

13. The computer medium of claim 11, wherein upon execution of the instructions, the data processing apparatus further performs operations comprising:

receiving at least one of additional performance data and additional assessment data; and updating the skills data to reflect the at least one of additional performance data and additional assessment data.

\* \* \* \* \*